United States Patent [19]

Field, Jr.

[11] 4,078,681

[45] Mar. 14, 1978

[54] DUAL PUMP HYDRAULIC CONTROL SYSTEM WITH PREDETERMINED FLOW CROSSOVER PROVISION

[75] Inventor: Jesse L. Field, Jr., Braidwood, Ill.

[73] Assignee: Caterpillar Tractor Co., Peoria, Ill.

[21] Appl. No.: 717,426

[22] Filed: Aug. 24, 1976

[51] Int. Cl.$^2$ .............................................. E02F 3/32
[52] U.S. Cl. ................................. 214/138 R; 60/421; 91/412
[58] Field of Search ...................... 214/138 R; 91/412; 60/420, 421

[56] References Cited

U.S. PATENT DOCUMENTS

| 3,720,059 | 3/1973 | Schurawski et al. | 60/421 |
| 3,800,669 | 4/1974 | Distler | 60/421 |
| 3,922,855 | 12/1975 | Bridwell et al. | 214/138 R |
| 4,030,623 | 6/1977 | Bridwell et al. | 214/138 R |

Primary Examiner—Drayton E. Hoffman
Assistant Examiner—Ross Weaver
Attorney, Agent, or Firm—Charles E. Lanchantin, Jr.

[57] ABSTRACT

A dual pump hydraulic control system with a predetermined flow crossover provision is disclosed including a first hydraulic control circuit having a first source of fluid pressure, a first motor, a first distributor valve in communication with the first source and moveable into an actuating condition for directing fluid to the first motor, a second motor, a second distributor valve in interrupted series communication with the first distributor valve and moveable into an actuating condition for directing fluid to the second motor; a second hydraulic control circuit having a second source of fluid pressure, a third motor, a third distributor valve in communication with the second source for directing fluid to the third motor; and a crossover valve and resolver network responsive to the actuating condition of the first distributor valve and to the actuating condition of the second distributor valve for communicating fluid from the second source to the second motor to supplement fluid from the first source to the second motor while preventing full fluid flow from both the first and second sources thereto. Such hydraulic system is particularly adapted to simultaneous swing and stick-in movement of a hydraulic excavator.

8 Claims, 2 Drawing Figures

DUAL PUMP HYDRAULIC CONTROL SYSTEM WITH PREDETERMINED FLOW CROSSOVER PROVISION

BACKGROUND OF THE INVENTION

The present invention is directed to a hydraulic control system which includes a pair of control circuits individually fed by a pair of pumps and having a crossover network for automatically utilizing the fluid flow capability of the second pump for the first circuit under predetermined conditions.

Hydraulically operated material handling machines are well know which have two or more engine driven pumps for supplying pressurized fluid to the various motors and double acting hydraulic jacks thereof. These motors and jacks propel and maneuver the machine and also operate the material handling implements mounted thereon. The prior art in this area is exemplified by the following patents:

U.S. Pat. No. 2,445,781 issued July 27, 1948 to E. J. Hrdlicka, Jr.

U.S. Pat. No. 3,208,221 issued Sept. 28, 1965 to J. R. Schuetz

U.S. Pat. No. 3,693,350 issued Sept. 26, 1972 to J. D. Petro, et al

Brit. Pat. No. 1,044,851 published Oct. 5, 1966 to Auxitra, Societe Anonyme

Brit. Pat. No. 1,290,247 published Sept. 20, 1972 to Linde Aktiengesellschaft

Hydraulic control systems of the above-noted type frequently include a pair of pumps for individually supplying a pair of circuits having two or more motors. By selectively shifting the various distributor valves, fluid flow may be appropriately directed to the respectively connected motor for operation thereof. However, when these distributor valves and motors are disposed in interrupted series, sufficient flow is often not available to the downstream motor when the upstream motor is operated. Consequently, a separate manually operated control lever and associated hydraulic componentry is sometimes used to enable the flow from the second pump to be used to operate one of the downstream motors of the first circuit. The componentry to do this is often referred to as a crossover valve network and, in general, such network more effectively uses the available pump capacities. While a crossover network improves the multi-function capabilities of the system and effects economies of construction since fewer pumps and individualized control loops are required, it is sometimes undesirable to have to manually move another control lever to achieve the crossover function when the operator is busy manipulating the machine.

Still another problem is that while prior art control systems allow the fluid flow from two or more pumps to combine in order to operate a particular motor, and with the other motors usually being idle, such action often results in operating it too fast for conditions. Thus, full dual pump fluid flow is a deterrent to the controllability and efficiency of that motor and the related implement involved.

SUMMARY AND OBJECTS OF THE INVENTION

According to the present invention there is provided a novel dual pump hydraulic control system for supplying fluid to two separate series of distributor valves and including an automatically responsive crossover network to more effectively use available pump flow.

Accordingly, it is an object of this invention to overcome the aforementioned briefly described problems by providing a dual pump hydraulic control system having an improved crossover valve network for a material handling machine.

Another object of this invention is to provide such a system which is effective to automatically achieve crossover flow operation to a particular motor under predetermined conditions.

Another object of the invention is to provide a system of the aforementioned type which will prevent full fluid flow from both pumps to that particular motor and hence will prevent operating it at an excessive rate of speed.

Another object of the invention is to provide a hydraulic control system of the character described for powering a hydraulic excavator and maximizing its efficiency of operation.

Other objects and advantages of the present invention will become more readily apparent upon reference to the accompanying drawings and following description.

DESCRIPTION OF THE PREFERRED EMBODIMENT

Figure 1:
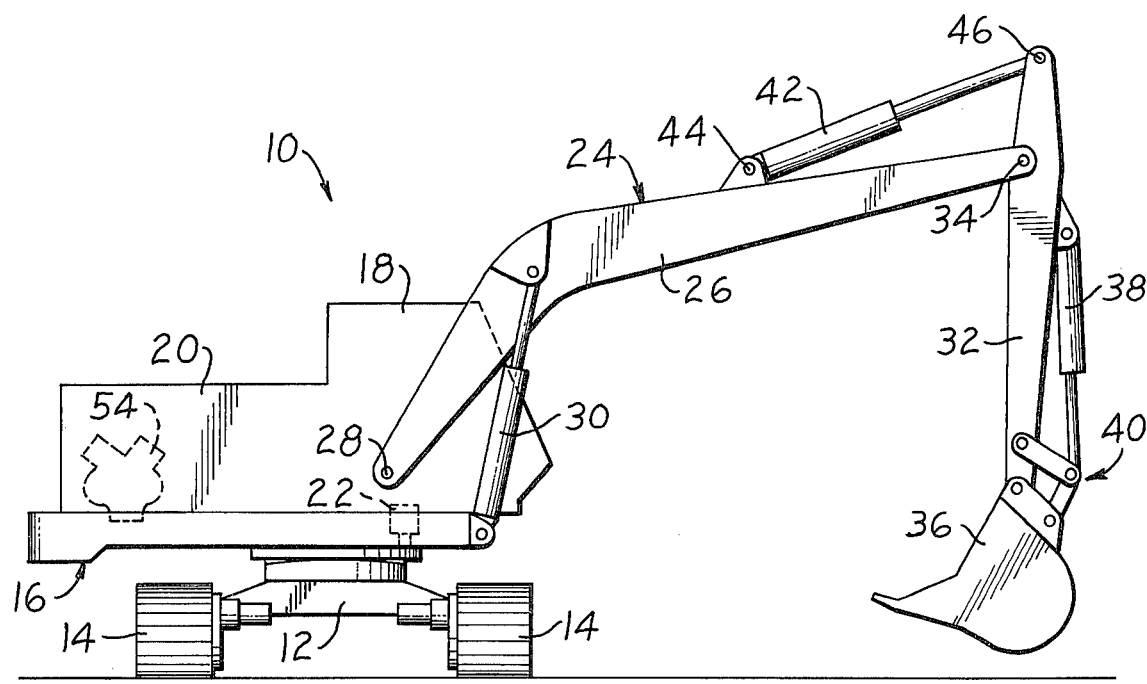
FIG. 1 is an elevational view of a hydraulic excavator incorporating the hydraulic control system of the present invention, and particularly showing the motors and/or hydraulic jacks used therewith.

Referring initially to FIG. 1, there is illustrated a typical hydraulic excavator 10 including an undercarriage 12 supported on rotatable wheels or tracks 14. A superstructure or platform 16 is rotatably supported on the undercarriage and includes an operator station 18 and an engine compartment 20. A hydraulically powered swing motor 22 is mounted on the superstructure, and when actuated will rotate the superstructure in either direction through 360° on the undercarriage to position a material handling implement 24 into the appropriate working or transporting condition.

The material handling implement 24 includes a boom 26 which is rockably mounted on the superstructure 16 at a pivot point 28 and is manipulatably raised or lowered thereabout by a pair of hydraulic motors or boom lifting jacks 30. An arm or stick 32 is rockably mounted on the distal end of this boom at a pivot joint 34 and pivotally carries on the outer end thereof an implement or bucket 36. A hydraulic motor or bucket operating jack 38 is pivotally mounted on the arm and connected to suitable bucket linkage generally designated by the reference numeral 40 for rocking the bucket into its digging and transporting conditions. Moreover, another motor or stick operating jack 42 is pivotally mounted on the boom at a pivot joint 44 and connected to the other end of the arm at a pivot joint 46 for manipulating both the arm and bucket into various working attitudes.

Figure 2:
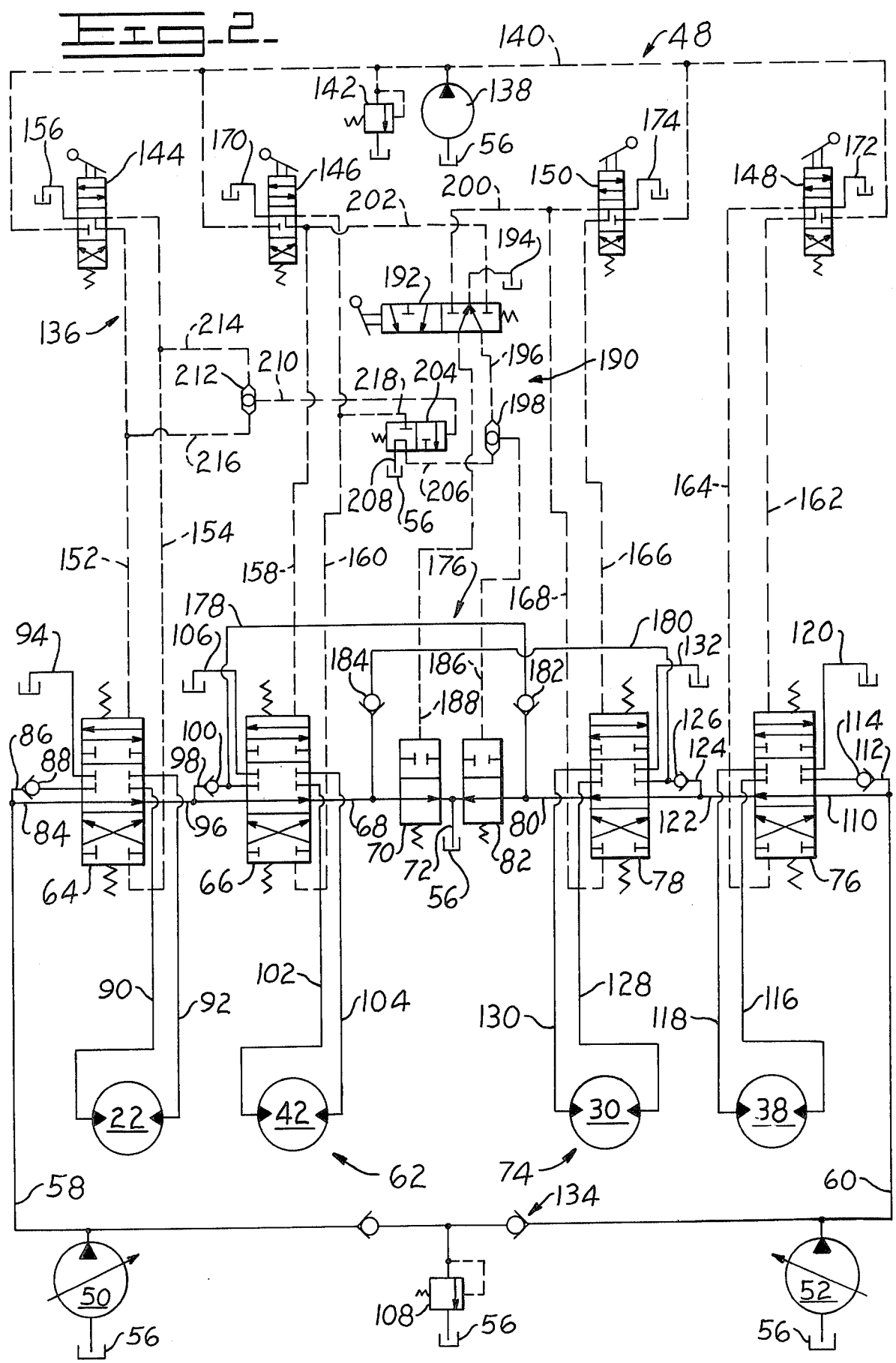
FIG. 2 is a schematic diagram of a dual pump hydraulic control system incorporating the crossover valve and resolver network of the present invention.

Fluid for manipulating and controlling the swing motor 22, and the jacks 30, 38 and 42 is supplied by the dual pump hydraulic control system of the present invention and referred to generally by the reference numeral 48 in FIG. 2. Such system includes a first variable displacement pump 50 and a second variable displacement pump 52 which are driven by an engine 54 disposed within the engine compartment 20 and referred to earlier with reference to FIG. 1. Accordingly, these pumps communicate with a common fluid reservoir or tank 56 to respectively supply fluid to a first main rail or supply line 58 and a second main rail or supply line 60.

More particularly, the first supply line 58 serves as a source of pressurized fluid for a first hydraulic control circuit 62 including a first distributor valve 64 for controlling the swing motor 22 and a second distributor valve 66 for controlling the stick operating motor or jack 42. The fluid, after flowing through these open centered valves without diversion for operation of a motor, passes along a conduit 68 through a blocker valve 70 and to a return passage 72 leading back to the reservoir 56. This arrangement of the distributor valves is known as an interrupted series arrangement.

In a like manner, the second supply line 60 serves as a second source of pressurized fluid for a second hydraulic control circuit 74 including a third distributor valve 76 for controlling the bucket operating motor or jack 38, and a fourth distributor valve 78 for operating the boom lifting motors or jacks 30. After flowing through these open centered valves, the fluid flows through a conduit 80, a second blocker valve 82, and the return passage 72 back to the reservoir 56.

It is to be recognized that the distributor valves 64, 66, 76 and 78 are spring biased to an open centered position, as illustrated, and are essentially of the same construction. For example, the first distributor valve disposed at the left when viewing FIG. 2 is in communication with the supply line 58 through a branch conduit 84 and a drive motor supply conduit 86 having a load check valve 88 in series therewith. This distributor valve is pilotably moved in the instant embodiment to modulatably and reversibly deliver fluid to the swing motor 22 through either one of a pair of conduits 90 and 92, and with the other conduit being placed in return communication with the reservoir 56 through a drain conduit 94.

In the illustrated position of the first distributor valve 64, fluid is uninterruptably supplied to the second distributor valve 66 by way of a connecting conduit 96. Consequently, the second distributor valve operates in an auxiliary manner when pilotably moved upwardly or downwardly from the position shown in the drawing, to permit modulated and reversible fluid delivery from a motor supply conduit 98 and a load check vlave 100 to the stick operating jack 42 through a pair of conduits 102 and 104, and with the return fluid being communicated back to the reservoir 56 through a drain conduit 106.

In a conventional manner the pump 50 is protected from over-pressurization through a main relief valve 108 set, for example, to relieve fluid back to the reservoir 56 at 280 kg. per sq. cm. (4000 psi). Furthermore, it is to be noted that the conduits 90, 92, 102 and 104 leading to the swing motor 22 and stick operating jack 42 are similarly protected against high pressure and cavitation by relief valving and make-up valving of the usual type, and not shown for sake of illustrative simplicity.

As may be appreciated from the above, the second hydraulic control circuit 74 is substantially a mirror image of the first hydraulic control circuit 62. The third distributor valve 76 thereof is coupled to the supply line 60 through a branch conduit 110 and a motor supply conduit 112 having a load check valve 114 therein. Consequently, the third distributor valve is positionable to deliver fluid to the bucket operating jack 38 through a pair of conduits 116 and 118, with the return fluid being communicated to the reservoir 56 through a drain conduit 120. In a repetitive manner the fourth distributor valve 78 receives fluid from the third distributor valve in the position illustrated by way of connecting conduit 122 and serves to direct fluid from a motor supply conduit 124 and a load check valve 126 to the boom lifting jacks 30 through a pair of conduits 128 and 130, with return by way of a drain conduit 132.

The motors 30 and 38 of the second hydraulic control circuit 74 are likewise protected by relief valves and make-up valves of the usual type and not shown, and the supply line 60 thereof is arranged to be in fluid communication with the main relief valve 108 through a check valve apparatus 134. Such apparatus serves to separate the second pump 52 from the first pump 50 and yet to allow common use of the relief valve.

In the illustrated embodiment of FIG. 2 the distributor valves 64, 66, 76 and 78 are independently moved from their open center positions by a manually operated pilot circuit 136 disposed in the upper portion of the drawing. Such pilot circuit allows remote operation of the distributor valves and utilizes relatively low pressure in the pilot conduits thereof as generally illustrated in broken lines. Particularly, a pilot pump 138 driven by the engine 54 draws fluid from the reservoir 56 and supplies it to a supply conduit 140 whose pressure is established at a value of approximately 20 kg. per sq. cm. (300 psi) by a relief valve 142. This pilot supply conduit is subsequently directly communicated to four manually operated, directional pilot control valves 144, 146, 148 and 150 which are respectively disposed in fluid biasing communication with the four distributor valves 64, 66, 76 and 78.

More specifically, manual positioning of the first pilot control valve 144 from the centered position shown will allow pilot pressure in the supply conduit 140 to be delivered to the one end of the first distributor valve 64 by way of either a signal conduit 152 or a signal conduit 154, and with the opposite end being communicated to a drain or depressurizing conduit 156. In a like manner the second pilot control valve 146 is operatively connected to the second distributor valve 66 through a stick-out signal conduit 158 or a stick-in signal conduit 160, the third pilot control valve 148 is biasably associated with the third distributor valve 76 through a pair of signal conduits 162 and 164, and the fourth pilot control valve 150 is associated with the fourth distributor valve 78 through a boom-lower signal conduit 166 and a boom-raise signal conduit 168, and with the opposite ends of the distributor valves being in open communication respectively with a drain conduit 170, a drain conduit 172 and a drain conduit 174.

Pursuant to the present invention, provision is made to supply fluid from the second pump 52 and the second hydraulic control circuit 74 to operate the stick operating jack 42 of the first hydraulic control circuit 62 under predetermined circumstances. In addition, fluid is supplied from the first pump 50 to operate the boom lifting jacks 30 under other predetermined circumstances. To achieve this a crossover valve network 176 is utilized which includes the previously mentioned blocker valves 70 and 82, and a pair of crossover lines or conduits 178 and 180. The crossover line 178 is in communication with the conduit 80 downstream of the fourth distributor valve 78 via its connection with the supply conduit 98. And, in a mirrored manner, the crossover line 180 is connected to the conduit 68 downstream of the second distributor valve 66 and to the supply conduit 124 leading to the fourth distributor valve. A one-way check valve 182 and a one-way check valve 184 are disposed in series with the crossover lines 178 and 180 respectively to prevent reverse flow therethrough.

Both of the blocker valves 70 and 82 are spring biased to a first condition as illustrated to permit unused fluid in the conduits 68 and 80 to be returned back to the reservoir 56. However, for the crossover line 178 to operate in the intended manner the second blocker valve 82 must be lowered when viewing the drawing to a second or blocking condition. Such blocking condition is effected by the presence of pressure fluid in a pilot signal line 186 leading to the upper end thereof. Likewise, the downward movement of the first blocker valve 70 to a blocking condition is accomplished by directing fluid thereto via a pilot signal line 188.

The availability of pressure in both of the pilot signal lines 186 and 188, and thus the degree of crossover flow permitted is determined by a resolver network 190. Included in the resolver network is a manually operated, two-position selector valve 192 which advantageously provides two separate modes of operation thereof. In the first position shown, the selector valve communicates the pilot signal line 188 to the reservoir 56 by way of a drain conduit 194, and also connects such drain conduit to a conduit 196 leading to a shuttle valve 198. In its second position the selector valve connects the pilot signal line 188 with an input conduit 200 branching off the boom-raised signal conduit 168, and further connects the conduit 196 to an input conduit 202 branching off the stick-out signal conduit 158.

The resolver network 190 further includes a pilot operated, two-position selector valve 204 which is in fluid communication with the shuttle valve 198 via a conduit 206 and with the reservoir through a drain conduit 208. It is spring biased to the position illustrated and is moved to the left when viewing the drawing by a predetermined pressure level in a swing motor pilot signal line 210. It is apparent that the line 210 will reflect pressure in either the signal conduits 152 or 154 leading to the first distributor valve 64, since it is coupled thereto through a shuttle valve 212 and a pair of conduits 214 and 216. Upon movement of the selector valve 204 to the left, any pressure available in the stick-in signal conduit 160 leading to the second distributor valve 66 and a branch conduit 218 is communicated through the valve and to the conduit 206, the shuttle valve 198, and the signal line 186 in order to bias the second blocker valve 82 downwardly as will hereinafter be more completely described.

Operation

In order to properly side crowd a trench or the like with the digging bucket 36, the superstructure 16 of the excavator 10 must be rotated by operating the swing motor 22 simultaneously with extension of the stick operating jack 42 to obtain the stick-in function. But since the swing and stick functions are in interrupted series as described above, with the swing function having priority, effective simultaneous action thereof must be obtained by using the second pump 52. This is initially accomplished by automatically piloting the selector valve 204 of the resolver network 190 to the left when viewing FIG. 2 to its active crossover position whenever the swing motor is operated.

Specifically, pressurization of either of the signal conduits 152 and 154 by manual movement of the swing motor pilot control valve 144 will communicate the pilot pressure in the supply conduit 140 to one end of the shuttle valve 212 via the conduits 214 or 216. From there such pressure is directed by the swing motor pilot signal line 210 to precondition the selector valve 204 to an active crossover position. Consequently, when the stick pilot control valve 146 is actuated to its stick-in condition pressure in the supply conduit 140 is directed through the control valve 146, the stick-in signal conduit 160, the branch conduit 218, and through the selector valve 204 to move the second blocker valve 82 downwardly via the conduit 206, the shuttle valve 198 and the signal line 186 as mentioned earlier. As a result, excess fluid in the conduit 80 from the second pump 52 is communicated through the crossover line 178 to the supply conduit 98. Since the same pressure in the stick-in signal conduit 160 also positions the second distributor valve 66 upwardly when viewing the drawing, the fluid in the crossover line is directed therethrough and to the conduit 104 to extend the jack 42.

It is apparent that the leftover fluid that is available in the conduit 96 from the first pump 50 as a result of partially modulated operation of the first distributor valve 64 may supplement that supplied by the crossover line 178 for operation of the stick operating jack 42. However, in accordance with one feature of the invention, dual flow from both of the pumps 50 and 52 is not permitted to the stick operating jack because such rapid rate of flow is a deterrent to the controllability and efficiency of the stick-in function during a digging cycle. Such adverse action is prevented by automatic deactivation of the selector valve 204 when the pressure in the swing pilot signal line 210 is modulated to a value below a predetermined level. For example, when the pressure in either the conduit 152 or 154 is lowered to such value the pressure is reflected in the signal line 210 and the selector valve automatically is spring biased back to the condition illustrated. In such condition the pilot signal line 186 to the second blocker valve 82 is open to the reservoir 56 and the blocker valve moves upwardly to return excess flow from the second pump directly to the drain conduit 72. Hence, when the stick pilot control valve 146 is shifted only the flow from the first pump and not utilized by the swing motor 22 is directed to the stick operating jack.

Under the above-described circumstances, coinciding with the illustrated position of the manually operated selector valve 192, it is to be recognized that the pilot signal line 188 to the first blocker valve 70 is always connected to the reservoir. Thus, the crossover network 176 relating to the boom lifting jacks 30, and particularly the crossover line 180 is not affective, and flow thereto is by way of the second pump 52 only.

Nevertheless, the manually operated selector valve 192 may be positioned to the right when viewing FIG. 2 to a second mode of operation wherein dual flow from both pumps 50 and 52 is available to operate the stick operating jack 42 or the boom lifting jacks 30 when certain operating conditions prevail. For example, when the second pilot control valve 146 is moved downwardly when viewing the drawing, pilot pressure in the supply conduit 140 is communicated to the stick-out signal conduit 158. This results in moving the second distributor valve 66 downwardly to communicate fluid from the first pump through conduits 84, 96, 98 and 102 to retract the stick operating jack. Simultaneously therewith, the stick-out pilot signal is communicated through the conduit 202, the valve 192, the conduit 196, the shuttle valve 198 and to the signal line 186 to bias the second blocker valve 82 downwardly. This results in preconditioning the crossover line 178 to direct supplemental fluid to the second distributor valve, if needed. As a result, the stick operating jack may be retracted at a relatively rapid rate by utilizing the combined flow from the pumps 50 and 52.

Still another advantage of the second position of the selector valve 192 is apparent when raising the boom 26 by extension of the boom lifting jacks 30. Movement of the fourth pilot control valve 150 upwardly will communicate pressure in the supply conduit 140 to both the boom-raise signal conduit 168 and the input conduit 200 leading to the selector valve. Therefore, simultaneously with upward movement of the fourth distributor valve 78 to allow fluid flow from the second pump 52 to the conduit 130 via the conduits 122 and 124, pressure is communicated to the first blocker valve 70 via the signal line 188. Accordingly, the crossover valve network 176 is preconditioned to allow supplemental flow from the first pump by way of the crossover line 180. In this way, the combined flow from both pumps is available to rapidly raise the boom.

While dual pump flow is provided to rapidly retract the stick operating jack 42 or to rapidly extend the boom lifting jacks 30 in the second position of the selector valve 192 as described immediately above, the resolver network 190 still advantageously prevents full flow from both pumps for extending the stick operating jack. This allows the stick-in function to be achieved at a proper rate of control just as it did in its first position. This is accomplished by communicating the pilot signal line 186 back to the reservoir 56, and corresponding disablement of the crossover line 178, via the shuttle valve 198 and the conduits 196, 202 and 170 when the second pilot control valve 146 is moved upwardly to the stick-in mode of operation, or via the same shuttle valve and the conduits 206 and 208.

It is thus apparent that the dual pump hydraulic control system of the present invention is automatically responsive to predetermined operating conditions to more effectively utilize available flow from both pumps even though the pumps are individually associated with an interrupted series of distributor valves. This is achieved by a crossover network 176 and associated resolver network 190 which is responsive to the actuating conditions to provide, for example, crossover flow for stick-in operation simultaneously with swing motor operation while preventing combined flow from both pumps thereto. Moreover, by manual movement of the selector valve 192 to a second mode of operation dual or combined flow from both pumps is available to operate either the stick operating jack in its stick-out direction or the boom lifting jacks in their rating direction.

While the invention has been described and shown with particular reference to a preferred embodiment, it will be apparent that variations might be possible that would fall within the scope of the present invention, which is not intended to be limited except as defined in the following claims.

What is claimed is:

1. A dual pump hydraulic control system with predetermined flow crossover provision, comprising:
   a first hydraulic control circuit including a first source of fluid pressure, a first motor, a first distributor valve in communication with said first source and having an actuating condition for directing fluid to said first motor, a second motor, a second distributor valve in interrupted series communication with said first distributor valve and having an actuating condition for directing remaining fluid from said first source to said second motor;
   a second hydraulic control circuit including a second source of fluid pressure, a third motor, a third distributor valve in communication with said second source for direction fluid to said third motor; and
   crossover valve means including a spring-biased, two position valve automatically responsive to said actuating condition to said first distributor valve and to said actuating condition of said second distributor valve for communicating fluid from said second source to said second motor while preventing full flow from both sources thereto.

2. The control system of claim 1 including an outlet conduit from said third distributor valve, and wherein said crossover valve means includes a crossover line which communicates flow in said outlet conduit to said second distributor valve.

3. The control system of claim 2 including pilot control valve means for remotely positioning said distributor valves and including a pair of signal lines communicating with the opposite ends of said first distributor valve and effective at a predetermined pressure level for moving it from a central open-centered condition to direct fluid to said first motor, said crossover valve means being responsive to a drop in pressure below said pressure level in either of said signal lines for preventing fluid flow from both said first and second sources to said second distributor valve.

4. An improved dual pump hydraulic control system of the type having a first control circuit including a first fluid pressure source, a first motor, a first distributor valve in communication with said first source for selectively directing fluid to said first motor, a second motor, a second distributor valve in interrupted downstream series communication with said first distributor valve for selectively directing fluid to said second motor, a second fluid pressure source, a third motor, a third distributor valve in communication with said second source for selectively directing fluid to said third motor, a depressurized outlet line leading from said third distributor valve, a blocker valve associated with said outlet line, a crossover line between said outlet line and said second distributor valve, wherein the improvement comprises:
   resolver network means including a two-position selector valve and shuttle valve means responsive to either direction of actuation of said first distributor valve for preconditioning said selector valve, moving said blocker valve into a position blocking said outlet line and communicating fluid flow from said second source through said crossover line to said second distributor valve and to said second motor for supplementing excess flow from said first source and said first distributor valve thereto.

5. A hydraulic control system for an excavator having a rotatable superstructure, a boom pivotally mounted on the superstructure, a stick mounted on the boom, and a bucket mounted on the stick, the system comprising:
   a first source of fluid pressure;
   a second source of fluid pressure;
   a swing motor for controlling movement of said super-structure;

a stick control motor;
a bucket control motor;
first distributor valve means for initially connecting said first source to said swing motor and then in interrupted series connecting said first source to said stick control motor;
second distributor valve mens for connecting said second source to said bucket control motor; and
crossover valve means for communicating fluid from said second source to said stick control motor in response to actuation of said swing motor and to actuation of said stick control motor solely in one direction of movement thereof while preventing full flow from both of said sources.

6. The control system of claim 5 including an outlet line from said second distributor valve means, and wherein said crossover valve means includes a blocker valve disposed in said outlet line and a resolver network responsive to position said blocker valve in a crossover mode of operation only when said first distributor valve means is supplying fluid to said swing motor.

7. The control system of claim 6 wherein said resolver network includes selector valve means for permitting full flow of fluid from both of said sources to said stick control motor in said one direction of movement.

8. The control system of claim 7 including a boom control motor, and wherein said second distributor valve means also connects said second source to said boom control motor in interrupted subservient series to said bucket control motor, said crossover means and said selector means also permitting full flow of fluid from both of said sources to said boom control motor in at least one direction of movement.

* * * * *